VOICE FREQUENCY SIGNAL TRANSLATION CIRCUIT

Filed April 25, 1967 5 Sheets-Sheet 1

RALPH A. JONES,
INVENTOR

BY Hall & Houghton
ATTORNEY

RALPH A. JONES,
INVENTOR

BY Hall & Houghton
ATTORNEY

RALPH A. JONES
INVENTOR
BY [signature]
ATTORNEY

VOICE FREQUENCY SIGNAL TRANSLATION CIRCUIT

Filed April 25, 1967 5 Sheets-Sheet 4

RALPH A. JONES
INVENTOR

BY [signature]
ATTORNEY

RALPH A. JONES
INVENTOR

BY Hall & Houghton
ATTORNEY

United States Patent Office 3,564,432

Patented Feb. 16, 1971

3,564,432

VOICE FREQUENCY SIGNAL TRANSLATION CIRCUIT

Ralph Archibald Jones, Highbury, London, England, assignor to Her Majesty's Postmaster General, London, England Filed Apr. 25, 1967, Ser. No. 633,447
Claims priority, application Great Britain, Apr. 29, 1966, 18,966/66
Int. Cl. H03d 1/04
U.S. Cl. 329—101 7 Claims

ABSTRACT OF THE DISCLOSURE

A signal translation circuit which combines a voice frequency input signal with a unipolar signal having an amplitude which follows the envelope amplitude of the input signal to produce a combined—unilateralized—signal which always retains the polarity of the envelope derived signal. Two-wire, bothway amplifier circuits, a conference telephone circuit and a loudspeaking telephone circuit using such translation circuits are described. All the circuits incorporate gates operated by unilateralized signals which have an instantaneous magnitude defined by the voice frequency signal envelope amplitude thereby directly relating the operating signal level to the input signal level.

Figure 1:
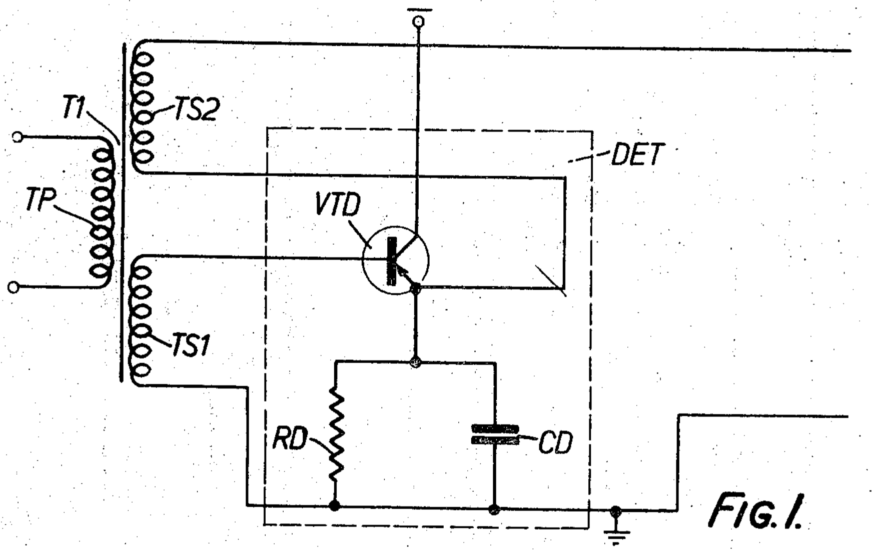

This invention relates to voice frequency transmission circuits and in particular to such circuits in which voice frequency signals are used to operate transmission control devices, e.g., switches (gates) or attenuators. Such circuits can be used, for example, in two-wire bothway amplifiers, telephone conference amplifiers and in loudspeaking telephones.

Present practice often makes use of gates in the form of semiconductor or thermionic devices, e.g., diodes, switched by voice frequency signals. In general, when the gate is open, a forward bias is applied to it greater than the peak value of the largest value voice frequency current expected to be passed by the gate in order to prevent clipping of speech current peaks. When the gate is closed, a reverse bias voltage is aplied, greater than the peak value of the highest value of speech frequency voltage likely to be developed across the diode gate in this condition, in order to prevent voice signals breaking through when the gate is intended to be closed. If the introduction of switching noises into the speech gate is to be avoided, the switching of these control speech currents and voltages, which has relatively large amplitudes, has to be carried out in a balanced manner and usually the switching circuit becomes more complex. Economically and technically this is disadvantageous.

According to the present invention, a voice frequency signal translation circuit includes a signal detector operable to generate a unidirectional polarity signal having an amplitude that varies with the envelope of the voice frequency signal, and signal combination means operable to combine the envelope derived signal and the voice frequency signal to generate an operating signal that at all times retains the said unidirectional polarity. Such a translation circuit can be used in a voice frequency signal transmission circuit to operate transmission control devices. The magnitude of the envelope derived component of the operating signal preferably has an instantaneous amplitude which is just adequate to maintain the unidirectional polarity of the operating signal. The invention utilises the observation that the audible content of a voice signal is not impaired by transmitting the voice signal as a signal with a mean D.C. level other than zero. In particular, by arranging that the mean D.C. level varies in the same sense as amplitude changes of the voice signal envelope, it can readily be ensured that the operating signal always has unidirectional polarity of a level related to the envelope amplitude and sufficient to operate the transmission control devices in a required manner. For example, when diode gates are used as the control devices, the operating signal can be arranged to have a level which changes with the envelope amplitude and is just sufficient, subject to any margin required, to operate the gate in the desired manner relative to the instantaneous voice signal level. The need for complex switching circuitry is thus avoided and, since the D.C. bias is effectively tailored to the instantaneous voice signal level (instead of being related to the largest expected amplitude voice signal level), switching is effected more efficiently.

In a particular form of translation circuit embodying the invention, there is a transformer having a primary winding for receiving a voice frequency signal. The transformer has two secondary windings one of which is connected to feed voice frequency signals to the input of the detector, via a buffer amplifier if required. The detector output is connected, via a buffer amplifier if required, other secondary winding to combine the envelope derived unidirectional polarity signal with the voice frequency signal to produce the operating signal. This latter secondary winding can also be used to apply the operating signal to transmission control devices in a transmission circuit. This type of translation circuit is particularly suited to application in a two-wire bothway voice frequency amplifier having GO and RETURN transmission paths each of which includes a signal amplifier having a transmission control device, e.g., a diode gate, connected to its input. One signal translation circuit has its signal combination secondary winding connected to feed operating signals via the transmission control device to the GO path amplifier and to receive signals from the RETURN path amplifier output. The other signal translation is connected in like manner to the input of the RETURN path amplifier and to the output of the GO path amplifier. It is arranged that the GO path operating signals are of opposite polarity to the amplified RETURN path signals and that the RETURN path operating signals are of opposite polarity to the amplified GO path signals. The amplified GO path signals may be of like or opposite polarity to the GO path operating signals and likewise for the amplified RETURN path signals and the RETURN path operating signals. D.C. or A.C. amplifiers can be used in the GO and RETURN paths.

In a conference amplifier circuit embodying the invention, individual speech input/output circuits (e.g., telephone line circuits) are connected to the input of a common amplifier by respective voice frequency signal operable input gates, and the common amplifier output is connected to the individual speech input/output circuits also by respective voice frequency signal operable output gates, the amplifier having an output impedance sufficiently low that the power delivered to a speech input/output circuit is not appreciably affected by the number of the speech input/output circuits in use. Each speech input/output circuit includes a translation circuit having a detector operable to derive a unidirectional polarity signal from the envelope of the voice frequency signal input to that speech input/output circuit, the combined voice frequency signal and envelope derived signal producing an operating signal applied as an enabling signal to the input gate connecting that speech input/output circuit to the common amplifier input. After amplification, the signal is fed to the output gates connecting the amplifier output to the individual speech input/output circuits. The arrangement is such that only the speech input/output circuit producing the largest instantaneous amplitude operating signal can gain access to the common amplifier input and that the output gate connecting the common amplifier output to that speech input/output circuit is closed for as long as it has access, the output gates connecting the common amplifier output to the remaining speech input/output circuits meanwhile being open.

In one arrangement, each translation circuit has an input transformer having a secondary winding coupled to the input of the voice frequency signal envelope detector (advantageously via a cathode-follower or emitter-follower type stage), which can include components for smoothing the envelope derived signal which is fed to a further secondary winding of the transformer to be combined with the voice frequency signal to produce the operating signal. The turns ratio of the two secondary windings is chosen to obtain a desired amplitude relation between the envelope derived component and the voice frequency signal component.

The further secondary winding is connected to supply the operating signal to the input gate connecting that speech input/output circuit to the common amplifier circuit and also to the output gate connecting the common amplifier output to that speech input/output circuit. In order to prevent the detector responding to outgoing signals fed to the further secondary winding from the common amplifier, a neutralising signal of appropriate amplitude and polarity can be fed in series with the first mentioned secondary winding. To this end, the speech input/output circuit output gate connected to the common amplifier output can be a transistor, the base-emitter junction of which functions as a diode gate whilst the collector signal is used for derivation of the neutralising signal.

A loudspeaking telephone embodying the invention includes a mircophone and an electro-acoustic transducer connected to a line transformer via voice frequency signal switchable send and receive transmission paths respectively. The send and receive circuits each include a translation circuit having a detector operable to derive a unidirectional signal following the envelope of the outgoing (send) or incoming (receive) speech signal, as the case may be, which is mixed with the appropriate voice frequency signal. The resultant send path operating signal is applied as an enabling signal to a gate in the send path and as a disabling signal to a gate in the receive path, whilst the resultant receive path operating signal is applied as an enabling signal to the receive gate and as a disabling signal to the send gate. The send and receive gates can open only one at a time, dependent on which of the send or receive voice frequency signals has the higher level since the levels of the operating signals are dependent on the levels of the speech signals.

Preferably, the loudspeaking telephone includes means for preventing receive signals picked up by the microphone over an acoustic path, from being applied to the send gate and causing spurious operation of the telephone.

Such a loudspeaking telephone has a relatively simple switching arrangement which operates efficiently without objectionable switching noises, since the instantaneously greater one of the send and receive voice frequency signals controls the switching and the corresponding operating signal preferably has a level just adequate to open its associated gate to pass the signal without distortion.

Figure 2:
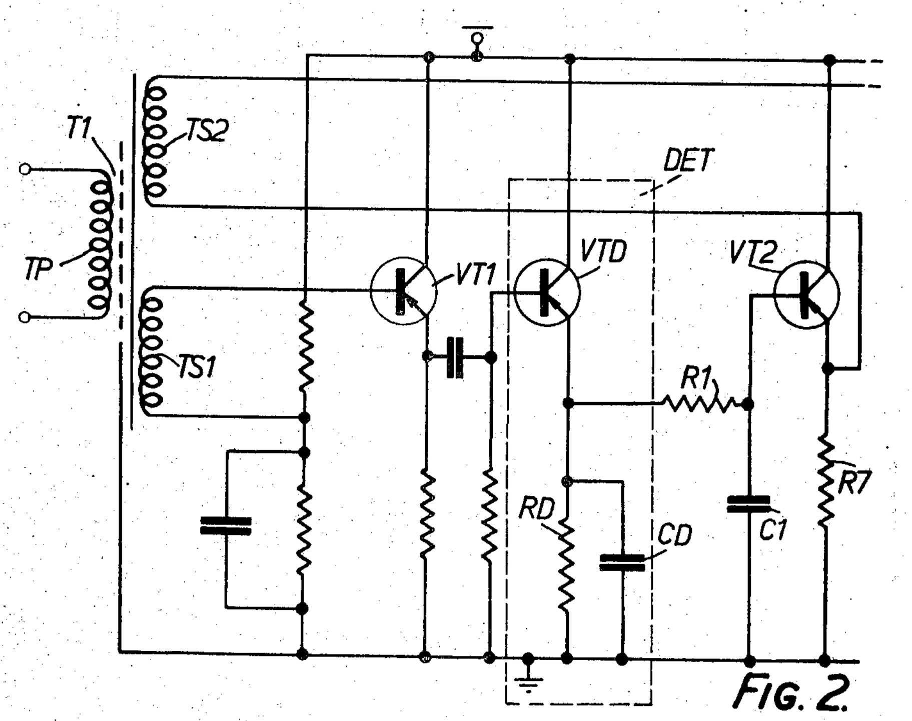
Figures 3A, 3B:
Figure 4:
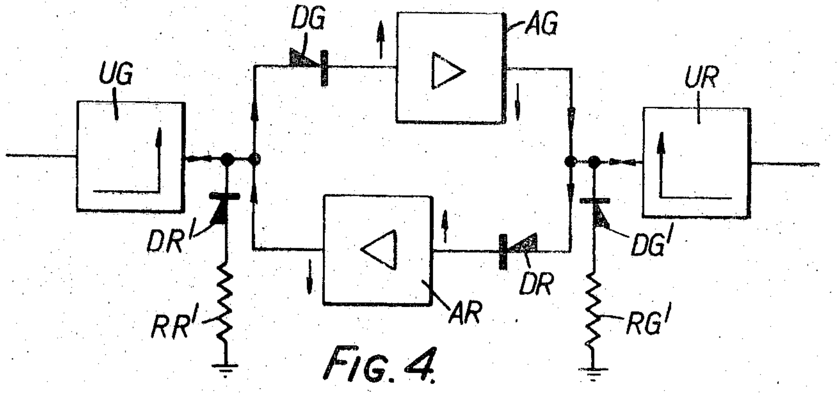
Figure 5:
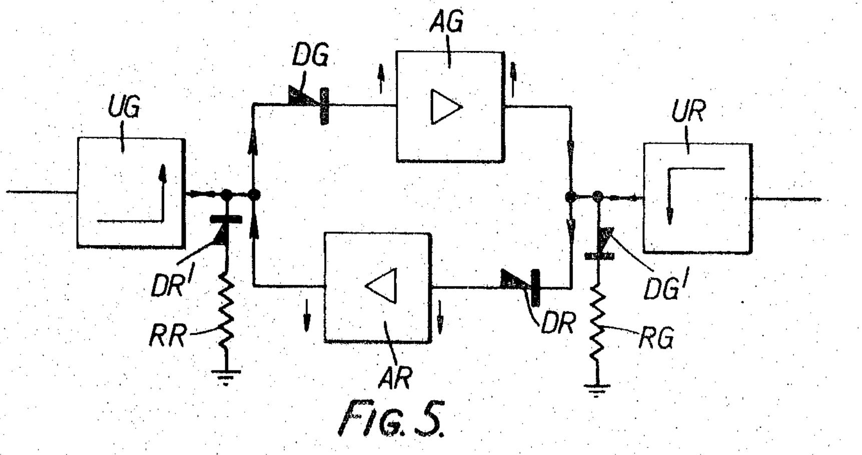
Figure 6:
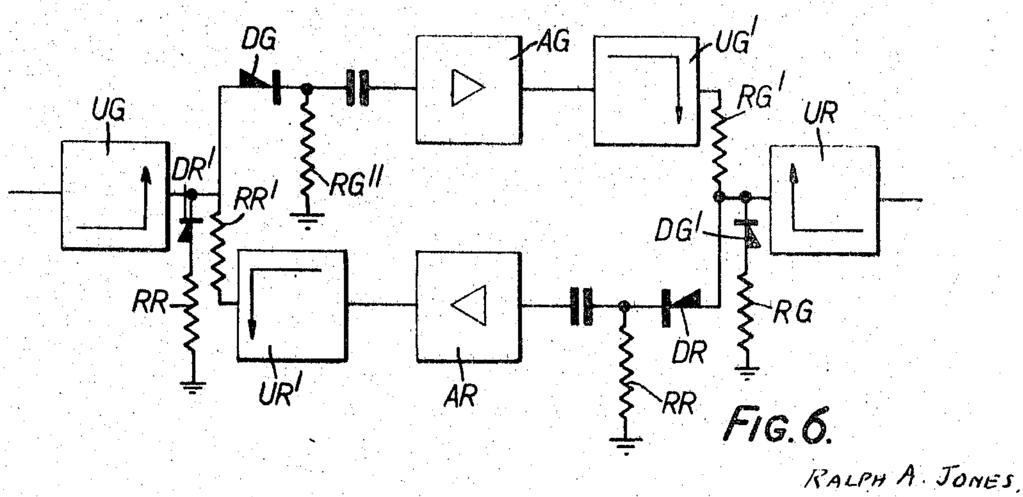
Figure 7:
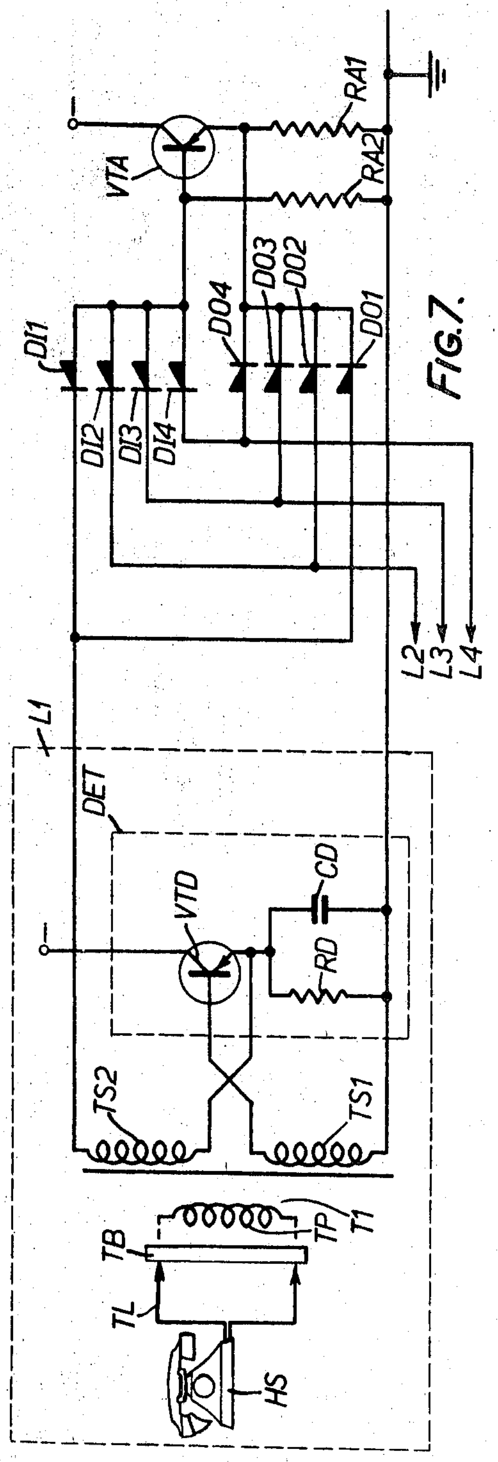
Figure 10B:
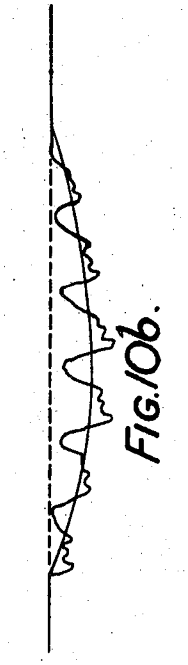
Figure 10A:
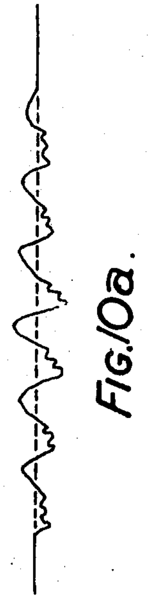
Figure 8:
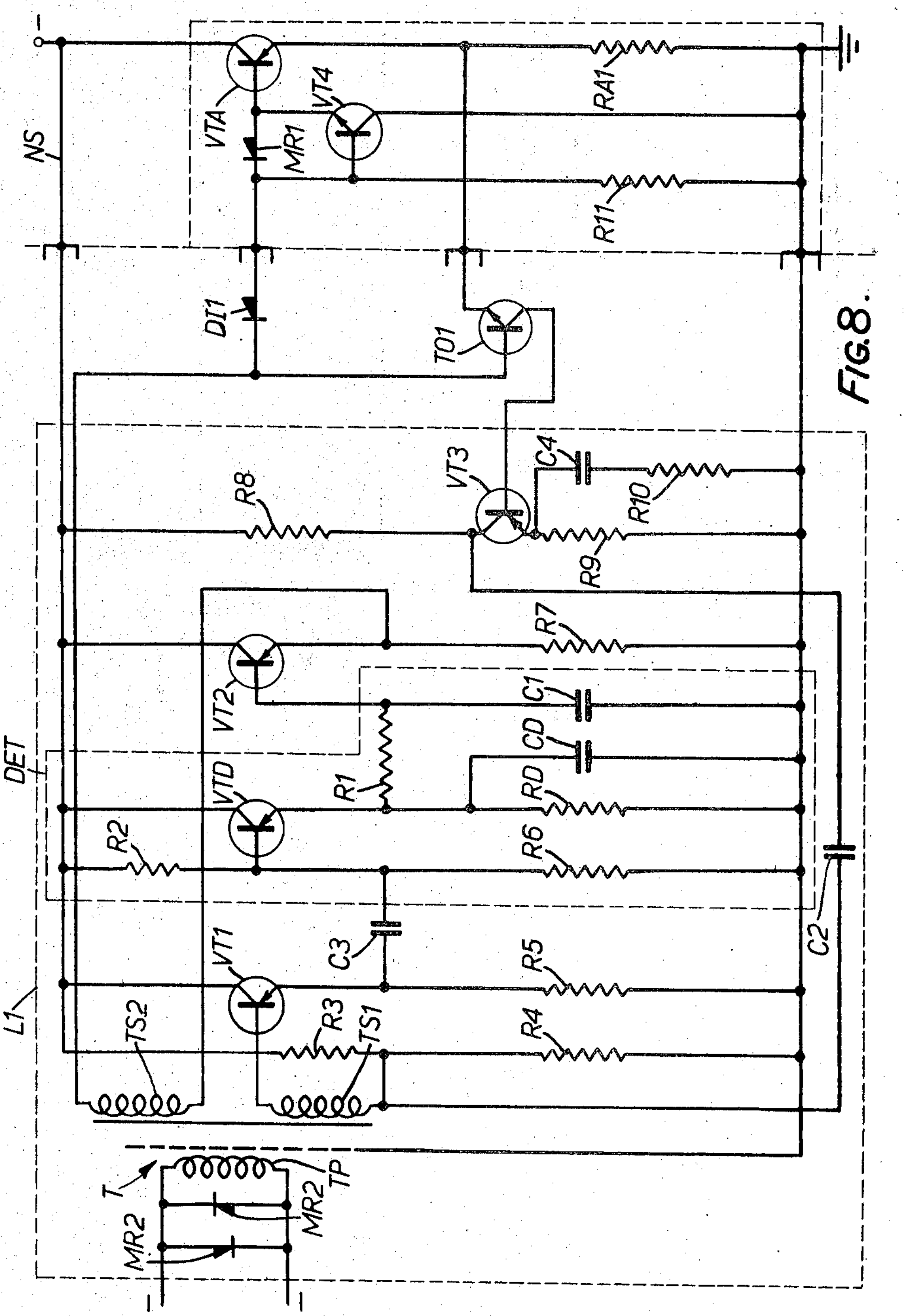
Figure 9:
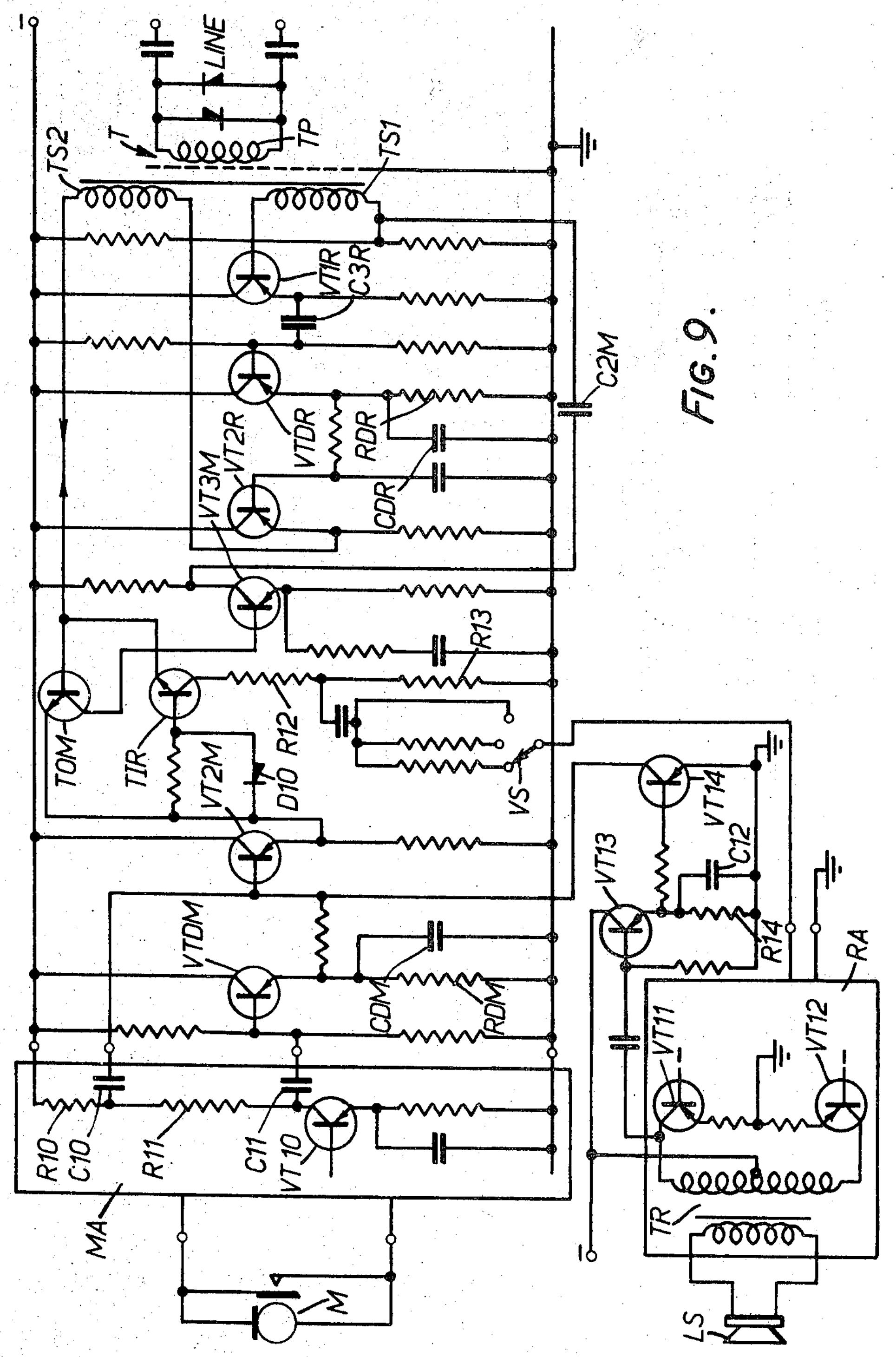

By way of example, the invention will be described in greater detail with reference to the accompanying drawings, in which:

FIGS. 1 and 2 show signal translation circuits, or unilateralizers, embodying the invention, FIGS. 3*a* and 3*b* show functional symbols representing signal translation circuits according to the invention, FIGS. 4, 5 and 6 are block schematic diagrams of two-wire bothway amplifiers embodying the invention, FIGS. 7 and 8 are circuit diagrams of telephone conference amplifiers embodying the invention, FIG. 9 is the circuit diagram of a loudspeaking telephone embodying the invention, and FIGS. 10*a* and 10*b* show waveforms explanatory of the operation of a signal translation circuit embodying the invention.

FIG. 1 shows the circuit diagram of a voice frequency translation circuit—or unilateralizer—embodying the invention. A transformer T1 has a primary winding TP for receiving voice frequency signals. A voice frequency signal envelope detector DET receives a voice frequency signal input from a secondary winding TS1 of the transformer and feeds an output, in the form of a unipolar signal the instantaneous amplitude of which varies with that of the voice frequency signal envelope, to another secondary winding TS2 of the transformer T1. The detector DET includes a p-n-p transistor VTD across the emitter-base circuit of which is connected the transformer winding TS1. The emitter circuit of the transistor VTD includes a resistor RD connected in parallel with a capacitor CD. The emitter output of the transistor VTD is negative-going with an instantaneous amplitude proportional to the envelope of voice frequency signals incoming from the transformer T1. This negative-going signal is combined with the voice frequency signal in the secondary winding TS2 to produce an operating signal. By way of example an illustrative voice frequency signal is shown in FIG. 10*a* and an operating signal derived from that voice frequency signal in accordance with the invention is shown in FIG. 10*b*. The turns ratio of the windings TS1:TS2 is so chosen that the operating signal produced is never positive. Thus at any instant, the operating signal obtained from winding TS2 is either zero or negative and thus is unipolar.

FIG. 2 shows a modified form of the unilateralizer described with reference to FIG. 1. In FIG. 2 the secondary winding TS1 is connected to the detector stage VTD by an emitter-follower buffer amplifier stage VT1. Also, the detector transistor VTD is connected to the secondary winding TS2 by an emitter-follower stage VT2, a filter R1, C1 being included between the emitter of transistor VTD and the base of transistor VT2, the latter having an emitter load resistor R7 which provides a D.C. path from the secondary winding TS2. The stage VT2 is not essential and could be omitted from FIG. 2. Also, the stage VT2 could be used to connect the transistor VTD and winding TS2 in FIG. 1.

In both FIGS. 1 and 2, the unipolar operating signal that is produced is always negative but positive operating signals could also be produced by unilateralizer embodying the invention. FIG. 3 illustrates functional symbols representing unilateralizers embodying the invention, which symbols have been used in certain of the figures for convenience. FIG. 3*a* shows a unilateralizer that produces positive operating signals and FIG. 3*b* shows one that produces negative operating signals. The A.C. inputs of the unilateralizers are adjacent the tails of the arrows and the unilateralized outputs are adjacent the arrowheads. Usually, but not always, a unilateralizer is a bothway device so that a unilateralized signal applied to the output terminals produces only the voice frequency component at the input terminals.

FIGS. 4, 5 and 6 illustrate two-wire bothway amplifiers embodying the invention.

The amplifier shown in FIG. 4 has a GO path including a D.C. amplifier AG the input path of which includes a diode DG. The amplifier has a RETURN path including a D.C. amplifier AR the input path of which includes a diode DR. A voice frequency signal unilateralizer UG as shown in FIG. 3*a* is connected to feed operating signals as forward biasing signals to the GO path diode DG whilst another voice frequency signal unilateralizer UR as shown in FIG. 3*a* is connected to feed operating signals as forward biasing signals to the RETURN path diode DR.

The amplifiers AG and AR each function to reverse the polarity of input signals in the manner indicated by arrows at the input and output of the amplifiers. Thus, the output signals from amplifier AG are prevented by the diode DR from being fed to the input of amplifier AR whilst the output signals from amplifier AR are prevented by the diode DG from being fed to the input of amplifier AG.

An amplifier similar to that shown in FIG. 4 could be constructed using unilateralizers as shown in FIG. 3*b*, with appropriate modification of the D.C. amplifiers in the GO and RETURN paths. FIG. 5 shows a bothway amplifier that operates in a similar manner to that described with reference to FIG. 4 except that it employs one unilateralizer of the type shown in FIG. 3*a* and one of the type shown in FIG. 3*b*; also the D.C. amplifiers AG and AR do not introduce polarity reversal of input signals.

These amplifiers just described will need to operate down to low D.C. voltage inputs if a reasonable dynamic range (e.g., 40 db) of A.C. signals is to be handled without use of high power supply voltages for the amplifiers. An alternative is to use A.C. amplifiers in the GO and RETURN paths and one suitable arrangement is illustrated in FIG. 6, the additional unilateralizers $UG^1$ and $UR^1$ preventing circulation of GO and RETURN path signals around the transmission loop defined by the GO and RETURN paths. This circuit is derived from that of FIG. 4 or a like circuit can be derived from FIG. 5.

In FIGS. 4 and 5 the unilateralizers act in no way as buffers for signals incoming to them. Thus incoming signals see the impedance of both GO and RETURN paths in parallel. For this reason and because the signal has a D.C. component at the point where the two paths are commoned, the input impedance of the GO amplifier AG and the output impedance of the RETURN amplifier AR should be equal and purely resistive. Ideally therefore, the input and output impedance of each amplifier should equal RZO where ½R provides the correct line termination when seen through the unilateralizer so that the correct output impedance is presented to line on outgoing signals, resistors RG and RR of value R must be shunted across the outputs of amplifiers AG and AR respectively via diodes $DG^1$ and $DR^1$ respectively.

In FIG. 6 the output circuits of the unilateralizers $UG^1$ and $UR^1$ must provide the resistance R. If the unilateralizers are of the type shown in FIG. 1 or FIG. 2 they may not have a high enough D.C. resistance to positive-going signals. One solution to this difficulty would be to make the output impedances of the amplifiers low so that the output impedances of the unilateralizers $UG^1$ and $UR^1$ have a low impedance as well as low D.C. resistance and then to build out these output impedances with resistors $RG^1$ and $RR^1$ of value R. $RG^{11}$ and $RR^{11}$ which provide the return paths for diodes DG and DR should be of value R and the amplifiers AG and AR should have input impedances high in value compared with R. When the unilateralizers are fed from a low impedance source the circuit shown in FIG. 3*a* can be used rather than that shown in FIG. 3*b*.

FIG. 7 shows an explanatory circuit diagram of a telephone conference amplifier embodying the invention. The amplifier uses a single transistor for amplifying speech signals incoming from and outgoing to individual lines of the conference circuit and presents a reasonably constant impedance regardless of the number of telephones switched in to the conference circuit at any time. The individual telephones gain access to the common amplifier by preferential biasing of diode gates connecting the individual telephone line circuits to the common amplifier input, it being possible only for any one diode gate to be open at a particular time, i.e., only one telephone at a time can gain access to the common amplifier input. The amplifier output is connected to the line circuits of the telephones by individual gates such that signals outgoing from the amplifier pass to all the line circuits except that currently having access to the amplifier input.

The gates are switched by operating signals produced by translation circuits as shown in FIG. 1 and comprised of the relevant speech signals, an illustrative waveform of which is indicated in FIG. 10*a*, superimposed on a D.C. level derived from the speech signal envelope and having instantaneous value such that the combined signal always has a unidirectional polarity, as shown in FIG. 10*b*, and at any instant biases a gate either to open or close it, with a bias level just adequate (with a small margin if required) for the instantaneous signal level concerned.

FIG. 7 shows the line circuit L1 of one telephone of a conference circuit and its connection to the common amplifier. In addition the incoming and outgoing gates of the other line circuits L2, L3 connected to the amplifier are shown, the remainder of the line circuits being identical to that illustrated.

The line circuit L1 includes a signal translation circuit as shown in FIG. 1 and like references are used for like components. A telephone handset HS can be connected via a transmission bridge and switching network TB and a line TL to the primary winding TP. The operating signal from the secondary winding TS2 of line circuit L1 is applied as an enabling signal to an input diode DI1 connected to the input of the common amplifier, shown as an emitter-follower transistor VTA. The transistor VTA has an emitter load resistor RA1 and the emitter is connected to the line circuit L1 by an outgoing diode DO1. The line circuits L2, L3, L4, etc., also are connected to the common amplifier transistor VTA by respective incoming diodes DI1, DI3, DI4, etc. and by respective outgoing diodes DO2, DO3, DO4, etc. A resistor AR2 is connected to hold the base of transistor VTA near earth potential in the absence of any signal input.

Assuming that a speech signal input is received by line transformer T1 of line circuit L1, the detector DET generates a negative-going output at the emitter of transistor VTD which follows the envelope of the speech signal input. The speech signal is superimposed on the envelope-derived signal in the winding TS2 which forward biases the incoming diode DI1 just sufficiently to pass the speech signal without any peak clipping. The output of the amplifier VTA forward biases the outgoing diodes DO2, DO3, DO4, etc., of line circuits L2, L3, L4, etc. but not the outgoing diode DO1 of line circuit L1, since due to the voltage loss through the common amplifier VTA, outgoing diode DO1 will be reverse biased. With the incoming and outgoing diode arrangement shown, when any particular line circuit gains access to the common amplifier, the line circuit does not see the low output impedance of the amplifier VTA since the associated outgoing diode is cut-off. Assuming that all the lines connected to the line circuits, L1, L2, etc., have zero impedance angle, then only the line circuit generating the greatest instantaneous negative potential will forward bias its associated incoming diode and gain access to the common amplifier input, the associated outgoing diode of that line circuit will be reverse biased and all the other outgoing diodes will be forward biased. Thus, the line circuit most instantaneously active will gain unique access to the common amplifier input and switching access from one line circuit to another is accomplished without switching noise.

The simple circuit shown in FIG. 7 has disadvantages in practical operation since distortion of the speech signals is introduced. Party this is due to the fact that telephone lines do not, in practice, have zero impedance angle. With lines having impedance angles of zero, the windings TS2 present resistive loads to the corresponding diodes DO on outgoing signals. When the impedance angle of a line differs from zero, each winding TS2 introduces a counter E.M.F. on outgoing signals and the diode gates therefore can become wrongly biased at some instants, resulting in distortion or malfunction of the circuit. In addition, the detector DET functions not only on incoming speech signals from the line but also on outgoing signals to the line; further, the detector load RD, CD, presents a high impedance to the envelope derived component of signals outgoing to the line. This results in the envelope derived component having the same time constant as the detector load at the end of speech utterances. The results of these effects is also to cause distortion of the speech signal waveforms.

In FIG. 8 there is shown the circuit of a practical circuit in which the above disadvantages are minimised and in which amplitude distortions of the speech signal, introduced by the detector DET in FIG. 7, are reduced.

In the circuit shown in FIG. 8, a translation circuit of a type similar to that shown in FIG. 2 is used and the line transformer T has a sufficiently high secondary turns ratio TS1:TS2 to produce an operating signal having an adequately large envelope derived component to compensate for lines having impedance angles other than zero. In the circuit shown in FIG. 8, a ratio of 2:1 has been used with satisfactory results. The emitter-follower stage VT1 acts as a buffer between the line transformer T1 and the detector, reducing loading of the line by the detector on negative-going speech signal peaks (which would cause peak clipping) to a negligible level. The resistor-capacitor network R1, C1 provides smoothing of the envelope derived signal at the emitter of transistor VTD. This smoothing reduces any sharp negative-going leading edges in the envelope derived component which would change the A.F. component of the composite signal produced in the transformer winding TS2. A low-pass filter would give added improvement but at greater cost. The emitter output of the detector transistor VTD is fed to the transformer winding TS2 via the emitter-follower transistor stage VT2, the introduction of which reduces the effects of the detector network RD, CD, on outgoing speech signals.

In FIG. 8, the outgoing diodes DO1, etc., of FIG. 7, are replaced by n-p-n transistors such as TO1 and in order to prevent the detector DET responding to outgoing speech signals, the voltage developed across the transformer winding TS1 by outgoing speech signals, is neutralised. To this end, the base of transistor TO1 is connected to the line circuit L1 to gate outgoing speech signals to the transformer winding TS2. The collector of transistor TO1 is connected to the input of a grounded emitter amplifier stage VT3 which doubles in amplitude the speech component of the outgoing signal and reverses its phase, the output from the collector of transistor VT3 being fed in series with the secondary winding TS1, thereby neutralising outgoing speech signals induced therein from winding TS2 (the amplitude doubling is required since the winding ratio TS1:TS2 is 2:1). Low frequency disturbances due to the envelope component of the outgoing speech output are eliminated from the neutralising signal before they reach the detector by a blocking capacitor C2 between transistor VT3 and winding TS1 and particularly by the low-capacitance capacitor C3 coupling the emitter-follower stage VT1 to the detector DET.

One disadvantage of the common amplifier VTA shown in FIG. 7 is that the resistor RA2 is not effective to hold the base of transistor VTA near earth potential at elevated temperatures. If the resistor value is decreased then the incoming line is undesirably loaded. In FIG. 8, a modified biasing arrangement for transistor VTA is used, including a diode MR1 and an n-p-n transistor VT4. In the absence of an incoming speech signal, the diode MR1 is cut-off and the base of transistor VTA sees the low impedance at the emitter of the transistor VT4. In the presence of an incoming speech signal, diode MR1 conducts and transistor VT4 is cut-off. This arrangement has been found to operate more satisfactorily than a conventional compound emitter-follower circuit and give much improved thermal stability.

Several measures are taken in FIG. 8 to provide for adequate handling of low level speech signals. For example, the detector DET includes a high value (e.g., 1M ohm) resistor R2 connected between the base of transistor VTD and the negative supply rail NS to ensure that succeeding transistors and diodes are biased nearer their points of conduction or switching-on. In addition, the incoming diodes DI1, etc., and diode MR1 are gold-bonded germanium diodes and the transistors preferably are germanium transistors to improve the handling of low speech signal levels. Further, the use of semiconductor junctions (diodes and emitter-base junctions) has been minimised in positions where adverse effect is likely on the lower limit of speech signals that can be handled. For example, an A.C. coupled emitter-follower stage VT1 is used, instead of a compound VT1, VTD circuit, to present a high impedance to the line. However, although germanium semiconductors are preferred, silicon devices could be used instead with suitable adjustment of the applied biases to allow for the different forward-conduction characteristics. In addition, with appropriate circuit modifications the p-n-p and n-p-n types of transistor could be interchanged and positive-going signals used instead of negative-going signals.

Using component values in the circuit of FIG. 8 as indicated in the following table, a successful 8-line conference amplifier has been constructed.

TABLE

VTD, VT1, VT2, VT3, type CV7005—CD 3 $\mu$f.
VTA, type ACY21 with heat sink—C1 0.5 $\mu$f.
TO1, VT4, type CV7349—C2 2 $\mu$f.
DI1, MR1, type CV7048—C3 0.1 $\mu$f.
MR2, type VC7040—C4 2 $\mu$f.
RD—33K ohms
RA1, R5, R7—2.2K ohms
R1—3.3K ohms
R2—1M ohm
R3, R6—6.8K ohms
R4—13K ohms
R8—1K ohm
R9—680 ohms
R10—910 ohms
R11—100K ohms The silicon diodes MR2, connected across the transfer primary winding TP, limit speech input voltages to about 1.2 v. peak-to-peak.

Inputs to and outputs from the conference amplifier circuit may be obtained by arrangements other than telephones, e.g., other forms of microphone could be used and the receivers could be replaced by loudspeakers.

FIG. 9 is a simplified circuit diagram of a loudspeaking telephone embodying the invention. The telephone has a microphone M which feeds an input to a microphone amplifier MA including an output stage transistor VT10 having a split collector load comprising resistors R10, R11. The full speech output across resistors R10, R11 is fed via capacitor C11 to the base of an envelope detector transistor VTDM having a parallel connected resistor RDM and capacitor CDM in its emitter circuit. The emitter signal of transistor VTDM follows the envelope of the microphone speech signal and is fed to the base of an emitter-follower transistor VT2M together with the speech signal fed via capacitor C10 from the load resistor R10 of transistor VT10. The low source impedance negative-going operating signal at the emitter of transistor VT2M is fed as a switching input to the emitter of an outgoing transistor gate TOM, the base of which is connected to the secondary winding TS2 of line transformer T. The collector of transistor TOM feeds an input to a phase inverting, amplitude doubling, stage VT3M the collector output of which is fed in series with secondary winding TS1 of transformer T to neutralise the outgoing signal voltage induced in winding TS1 from winding TS2. The capacitor C2M serves to remove the envelope component from the neutralising signal.

Incoming speech signals from the line transformer primary winding TP are fed by winding TS1 and emitter-follower stage VT1R to a receiver detector stage VTDR, the emitter circuit of which includes a parallel connected resistor RDR and capacitor CDR. The emitter signal of transistor VTDR follows the envelope of incoming speech signals and is fed by emitter-follower stage VT2R to the winding TS2 in which it is mixed with incoming speech signals. The resultant operating signal is fed to the emitter of an incoming transistor gate TIR and also applied to the base of outgoing transistor gate TOM. The collector output from gate TIR is developed across resistors R12, R13, and is fed via a volume switch VS to the input of a receive amplifier RA having a push-pull output stage including common emitter transistors VT1 and VT12 which feed a loudspeaker LS via output transformer TR.

As thus far described, it will be appreciated that the outgoing microphone gate TOM is switched by combined outgoing speech/envelope signals whilst the receive incoming gate TIR is switched by incoming combined speech/envelope signals. Assuming that the microphone signal predominates, transistor TOM is switched on due to the forward bias applied to its emitter and the negative signal applied to the base of transistor TIR via diode D10 cuts-off that transistor and closes the receive path of the telephone. Should the incoming speech signal level increase and predominate, then the negative-going signal fed to the emitter of incoming gate transistor TIR serves to forward bias the emitter-base junction of that transistor and also to apply a reverse bias to the base of outgoing transistor gate TOM, cutting-off that transistor. The outgoing signal path from the microphone thus is closed and that to the loudspeaker via gate TIR and amplifier RA is open. The switching biases applied to the gate TOM and TIR are unidirectional and change smoothly with the speech envelope amplitude, being just adequate to open the gates for the speech levels concerned. Thus, the switching in and out of the receive amplifier RA is accomplished smoothly and without objectionable switching noises.

In order to prevent acoustic feed-back between the loudspeaker LS and the microphone M opening the gate TOM, the collector of transistor VT11 of the receive amplifier RA feeds an input to a detector transistor VT13, the emitter circuit of which includes parallel connected resistor R14 and capacitor C12. When receive signals are fed to the amplifier RA, the output from the emitter of detector transistor VT13 switches on a transistor VT14 which short-circuits the spurious speech signal, due to the acoustic feedback, at the base of transistor VT2M. The time constant of C12, R14, is sufficiently long to maintain transistor VT14 switched on for the duration of the reverberation time of a room in which the telephone is located.

The amplifiers MA and RA normally will have stages preceding the output stages illustrated but since these stages are not relevant to the invention and can be of conventional design, they have not been illustrated.

In the description of FIG. 9, components identical in function to those shown in FIGS. 1, 2, 7 and 8 have like references followed by the identifying letter M for components associated with the microphone or send circuit of the telephone and by the letter R for components associated with the loudspeaker or receive circuit. Detailed explanation of the function of these components will be apparent from the previous description and has not been repeated in describing FIG. 9.

I claim:

1. A voice frequency translation circuit including rectifying and smoothing means connected to respond to a voice-frequency input signal to produce therefrom a signal of unidirectional polarity having an amplitude proportional to the envelope of the voice-frequency input signal and signal combining means responsive to the unidirectional polarity signal and the input signal to produce an output signal equal to the sum of said latter two signals, which output signal has the same polarity at all times.

2. A signal translation circuit according to claim 1, in which the rectifying and smoothing means is operable to generate a unidirectional polarity signal the instantaneous magnitude of which is just sufficient to maintain the said unidirectional polarity of the output signal.

3. A signal translation circuit according to claim 1, in which the rectifying and smoothing means includes a further network operable to smooth the unidirectional polarity signal.

4. A signal translation circuit according to claim 1, including a transformer having a primary winding for receiving the voice-frequency input signal, and also having first and second secondary windings, the first secondary winding being connected to feed the voice-frequency input signal to the rectifying and smoothing means, and the rectifying and smoothing means having an output connected to the second secondary winding for combination of the envelope derived unidirectional polarity signal with the voice-frequency input signal.

5. A signal translation circuit according to claim 4, in which the rectifying and smoothing means has an input to which the first secondary winding is connected by a buffer amplifier stage.

6. A signal translation circuit according to claim 5, in which the buffer amplifier stage is an emitter-follower transistor stage.

7. A signal translation circuit according to claim 4, in which the output of the rectifying and smoothing means is connected to the second secondary winding by a buffer amplifier stage providing a D.C. path from the second secondary winding.

References Cited

UNITED STATES PATENTS

| | | | |
|---|---|---|---|
| 1,808,150 | 6/1931 | Townsend | 329—170 |
| 2,663,796 | 12/1953 | Raisbeck et al. | 329—168X |
| 2,848,603 | 8/1958 | Schultz | 325—409 |
| 3,012,137 | 12/1961 | Riceman | 329—192X |
| 3,077,562 | 2/1963 | Key | 325—387X |

ALFRED L. BRODY, Primary Examiner

U.S. Cl. X.R.

307—264; 325—408; 328—115, 109, 170, 192